United States Patent Office 2,951,044
Patented Aug. 30, 1960

2,951,044

STABLE DISPERSIONS OF METAL OXIDE BLENDS AND PROCESS FOR THEIR MANUFACTURE

Ernst Wagner and Jean Diether, Rheinfelden, Baden, Germany, assignors to Deutsche Gold- und Silber-Scheideanstalt vormals Roessler, Frankfurt am Main, Germany, a corporation of Germany No Drawing. Filed July 18, 1955, Ser. No. 522,879

14 Claims. (Cl. 252—313)

This invention relates to improved aqueous dispersions of metal and metalloid oxides and to a novel process for their preparation. For convenience the term "metal" as used hereinafter shall be taken to include metalloids which function similarly to metals in the practice of this invention.

Dispersions and colloidal solutions of metal oxides such as silicon dioxide, titanium dioxide, aluminum oxide and others, have in recent times found numerous applications in industry, for example as textile fillers and coatings. Use is made either of the extremely finely-divided properties of solids present or of specified effects which, like slip-proofing, delustering or substantive absorption on fibers or fabrics, depend on the chemical nature of the dispersed and/or colloidally dissolved oxides. However, the attempt to combine the specific effects of several kinds of oxide by their simultaneous use involves great difficulties, when it is not desired, primarily because the result is not very successful, to treat the fibers or fabrics with different dispersions successively. Considerably more satisfactory results could be obtained if dispersions containing several oxides simultaneously were available for treating textiles as well as for other industrial purposes. Yet it is possible only with difficulty, and in some combinations not at all, to produce stable colloidal solutions or dispersions containing several oxides without occurrence of separation or premature flocculation, since, for example colloidal solutions of silica are generally not compatible with aluminum compounds. At the least, preparation of colloidal solutions or stable dispersions containing several oxides requires troublesome expedients, for example, the use of special protective colloids, i.e., comparatively large quantities of buffer salts, which by no means certainly ensures success and which colloids are moreover undesirable for many purposes where purity of the oxides is of decisive importance.

It has now been found that satisfactory suspensions of two or more different metal oxides can be produced by mixing into the aqueous medium oxides co-formed in the same reaction. In other words, when the metal oxides are formed simultaneously from a mixture of the gaseous metal-containing raw materials the co-mingled oxide product can then be suspended in high concentration in the aqueous medium.

It is the principal object of this invention to provide a novel composition comprising a stable suspension of metal oxides in substantially greater concentration than has heretofore been obtainable.

It is a further object of this invention to provide a novel aqueous suspension of mixed metal oxides of high concentration and stability.

It is another object of this invention to provide a process for producing such a composition.

To prepare such mixed oxides, which constitute the dispersed phase of the dispersion according to the invention, it is especially advantageous to proceed from a vaporous and/or gaseous mixture of volatile compounds of corresponding metals, which is subjected in a homogeneous gaseous phase at elevated temperature to decomposition under oxidative conditions, the mixed oxide being first formed as an aerosol and then, after comparatively rapid coagulation, recovered as an aerogel in extremely finely divided condition by separation from the gaseous or vaporous reaction products. This type of oxide is commonly known in the art as a pyrogenic oxide. As volatile compounds for this purpose, primarily halides, for example silicon tetrachloride, titanium tetrachloride, or else so-called silicochloroforms, are eligible, and may be decomposed and/or oxidized in suitably compounded mixture as a homogeneous mixture of vapors. Such oxidation may be conducted by reacting such mixtures in the presence of air or oxygen or oxygen-bearing gases or mixtures of gases, chiefly chlorine being formed in addition to the mixed oxide. However, more homogeneous mixed oxides, more favorable in size and shape of particles, are obtained if the mixtures of the starting materials are reacted with water vapor in such a manner that the formation of oxide is effected by hydrolysis. For this purpose, the reaction mixture may be treated with steam as such, or else the reaction may be carried on in the presence of gases and mixtures of gases that react with each other with formation of water and evolution of heat. In this mode of carrying on the reaction, in addition to the solid mixed oxide in finely divided form, there will be a gaseous reaction product essentially comprising hydrogen chloride. The temperature at which such reactions are carried on may vary within wide limits according to the desired properties of the product, especially with regard to particle size and condition of particle surface. Advantageously, such mixed oxides may be prepared at temperatures above 1000° C., for example at 1100° C., by allowing mixtures of halides, hydrogen or hydrogen-producing gases, and oxygen and/or gases or mixtures of gases producing the same to react in a flame. For certain purposes, however, it may likewise be advantageous to employ mixed oxides produced at lower temperatures, for example at 600° C.

Since the mixed oxides obtained by thermal decomposition in the gaseous phases are recovered, as afore said, in extremely finely divided and active form, it is possible by mechanical means to distribute them in a suitable dispersing agent and thus arrive at stable dispersions. Mechanical treatment may thus be confined to a simple mixing operation, as no further comminution of the dispersed phase is required. It is possible, for example, to proceed by soaking the mixed oxide in the dispersing agent and then distributing it by intensive agitation, for example with the air of a turboagitator. Instead of using a turboagitator, the mixed oxide may alternatively be processed in a ball mill in the presence of a dispersing agent, and dispersion effected in that manner. Since the mixed oxides obtained from the gaseous phase ordinarily exist predominantly in particle sizes of less than about 100 millimicrons and usually of less than 50 millicrons, dispersions are readily obtained which by commercial standards contain the solid phase in colloidal dispersion, so that it is also possible to secure colloidal solutions of mixed oxides by the process of the invention. The products according to the invention may in this form be utilized with especial success for numerous purposes.

It has been found that it may be of advantage in the process of dispersion to add minor amounts of phosphate in dissolved form to the dispersions. For this purpose, alkali-metal phosphates are preferably used, for example metaphosphate or alternatively alkalimetal polyphosphate, introduced into the dispersion in amounts of about 0.1 to 2% and preferably 0.5 to 1%.

Depending on the nature of the mixed oxides and the application, it may be requisite to adjust the dispersion to a particular desired pH value. To raise the pH value towards the alkaline side, it is advantageous to use an additive of alkali-metal silicates in the form of water glass, which may at the same time have a stabilizing effect. Quantities are of much the same order of magnitude as specified above for phosphates.

Such additives facilitate the preparation of dispersions according to the invention especially when high contents of solid are desired. Thus, surprisingly enough, it has been found that compared to conventional oxide dispersion, even including those based on very finely divided pyrogenically produced oxides, the solid content of mixed oxides can be increased very substantially without impairing the stability of such dispersions. While in dispersions or colloidal solutions of single oxides it was not feasible in practice to exceed a concentration of about 20% oxide, it is readily possible according to the present invention to produce stable dispersions having a mixed oxide content of over 30 g. and even up to more than 60 g. of solids in 100 cc. of dispersion. No extended discussion is required to show that such highly concentrated dispersions offer important industrial and commercial advantages.

It must for the time being remain an open question what structural constitution and what conditions of binding are to be ascribed to the mixed oxides employed according to the invention. It is likewise irrelevant to the purpose of the present invention whether the mixed oxides are merely a preliminary stage or a more or less developed form of a definite silicate. What is essential is that precisely in respect of their use according to the invention for constituting stable dispersions, they manifest a specific behavior clearly differentiated, and in a surprising degree, from the properties of a mechanical mixture or blend of oxides produced under the same conditions. It was pointed out initially that the addition of foreign oxides to oxide dispersions or solutions in many cases leads to a flocculation or to an impairment of the stability of the dispersion. At best, however, such additions lead to a marked thickening of corresponding dispersions that is extremely disadvantageous not only to stability but also to the practical usefulness of the material, and must be regarded as a preliminary stage of coagulation or flocculation. In the following, pertinent comparative measurements are tabulated, showing what solid contents for given viscosity the dispersions will hold in stable form, according as the dispersed phase used is mixed oxide according to the invention or mechanical mixtures of the same components in like quantitative composition.

Conversely, these data may be used to infer the capacity of the classes of materal compared to form highly concentrated stable dispersions or colloidal solutions. Each test was based on two grams solid substance for both the mixture of oxides and the coformed oxide blend and the quantity of water determined with which that quantity of solid substance required to be mixed in order to produce the same consistency. For comparison, the percentage content of solid substance in each dispersion is also given.

In Table 1, physical mixtures of silicon dioxide and aluminum oxide in various proportions are compared with conformation blends of the corresponding oxides. Both the mixed oxides and the oxide blends were obtained by decomposition of the corresponding halides in the presence of hydrogen and oxygen in a flame at 1100° C. The charge of the combustion gases in halide mixture or halide to be decomposed was in each instance 300 to 350 g. per cu. m. In addition, the table includes some dispersions in which 1% each of phosphate in the form of sodium metaphosphate was added.

The table clearly shows that physical admixture of aluminum oxide with silica substantially diminishes the capacity of the dispersion for solid material with increasing aluminum oxide content, i.e., that for like final consistency the aluminum oxide exerts a marked thickening

TABLE 1

| Composition | Additive | Oxide Mixture | | Coformed Oxide Blend | |
|---|---|---|---|---|---|
| | | g. Water | Percent Solid Content | g. Water | Percent Solid Content |
| $SiO_2$ | | 8.5 | 19.0 | | |
| $SiO_2/1\% \ Al_2O_3$ | | 10.5 | 16.0 | 4.2 | 32.0 |
| $SiO_2/1\% \ Al_2O_3$ | 1% phosphate | 12.3 | 14.0 | 3.0 | 40.0 |
| $SiO_2/5\% \ Al_2O_3$ | | 13.5 | 13.0 | 3.7 | 35.0 |
| $SiO_2/5\% \ Al_2O_3$ | 1% phosphate | 14.0 | 12.5 | 2.4 | 45.0 | effect which may be regarded as the preliminary stage of flocculation. Even the simultaneous presence of small amounts of phosphate will not serve to compensate this effect. On the contrary, the oxide blends permit a substantially higher solid content than the pure silica for like viscosity, such content being slightly increased with increasing aluminum oxide proportion, into contradistinction to the effect of aluminum oxide in the oxide mixture. Here again, the addition of small amounts of phosphate permits some further increase in solid content with increasing aluminum oxide.

Similarly, Table 2 shows comparative tests of mixed oxides and oxide blends consisting of silicon dioxide and titanium dioxide. All oxides were obtained in the same manner as previously described in connection with the experiments of Table 1. Here again, 2 grams of solid were taken in each case and dispersed to the same consistency with a measured quantity of water.

TABLE 2

| Composition | Oxide Mixture | | Coformed Oxide Blend | |
|---|---|---|---|---|
| | g. Water | Percent Solid Content | g. Water | Percent Solid Content |
| $SiO_2$ | 8.5 | 19.0 | | |
| $SiO_2/1\% \ TiO_2$ | 10.0 | 16.5 | 3.4 | 37.0 |
| $SiO_2/3\% \ TiO_2$ | 10.5 | 16.5 | 2.1 | 49.0 |
| $SiO_2/25\% \ TiO_2$ | 9.0 | 18.0 | 2.0 | 50.0 |
| $SiO_2/35\% \ TiO_2$ | 8.5 | 19.0 | 1.5 | 57.0 |
| $SiO_2/50\% \ TiO_2$ | 8.0 | 20.0 | 1.4 | 59.0 |

This table also shows that the mixed oxides of the $SiO_2$-$TiO_2$ system, with respect to thickening effect and/or dispersibility, show quite different behavior from qualitatively like oxide blends. Here again the oxide blends yield stable dispersion, or colloidal solution, with a content of dispersed phase that is quite unattainable with oxide mixtures for given viscosity.

The preparation and compounding of oxide dispersions according to the invention is further illustrated by the following examples.

*Example 1*

To prepare a dispersion containing 35 g. solid matter in 100 cc., 3.25 kg. of an oxide blend of silicon dioxide and 1% aluminum oxide is soaked in 7.75 kg. water with addition of 10 g. sodium trimetaphosphate. The mixture is then processed for 10 minutes with a turboagitator and the dispersion adjusted to a pH of 5.0 by addition of 35 cc. water glass. The viscosity is twice that of water at the same temperature. The oxide blend was obtained by reacting a mixture of silicon tetrachloride and aluminum chloride in the vapor phase with hydrogen and oxygen in a flame at 1100° C.

*Example 2*

500 g. of an oxide blend prepared in the manner described in Example 1 is introduced into 470 g. water with 2.3 g. sodium metaphosphate. During agitation with a turboagitator, an additional 3 cc. of water glass is added, so as to yield a dispersion with a pH of 5.0 containing 70 g. of solid matter in 100 cc. The dispersion has 3.8 times the viscosity of water.

*Example 3*

An oxide blend of 94% $SiO_2$ and 6% $Al_2O_3$ obtained from a corresponding halide mixture at 1100° C. is distributed in a quantity of 4.5 kg. in 8 kg. of water, adding 15 g. sodium trimetaphosphate. After 15 minutes agitation and adjustment of pH with 45 cc. of water glass, a stable dispersion of 45 g. solid matter in 100 cc. is obtained.

*Example 4*

From a mixture of silicon tetrachloride and titanium tetrachloride at 1100° C. in the flame, an oxide blend with 3% $TiO_2$ is produced. This mixed oxide, with addition of 8 g. sodium metaphosphate, is treated for 10 minutes with a turboagitator, yielding a dispersion of 45 g. solid matter in 100 c. solution of viscosity 2.2 times that of water. To adjust to a pH value of 5, 9 g. water glass is required.

*Example 5*

In much the same way as in Example 4, an oxide blend of silicon dioxide and 12% titanium dioxide is made up by distribution of 2.2 kg. in 3.5 kg. water with addition of 20 g. sodium tripolyphosphate, to a solution of 55 g. solid in 100 cc. During agitation, 40 g. water glass is added to adjust the pH to 5.0.

*Example 6*

46.5 kg. of an oxide blend of silicon dioxide and 1% aluminum oxide is distributed in 260 kg. water with addition of 0.05 kg. trimetaphosphate. The mixture is then processed for 60 minutes with a turboagitator. After the dispersion is completed, the pH-value is adjusted by addition of 0.5 liter of water glass. The oxide blend was obtained by reacting a mixture of silicon tetrachloride and aluminum chloride in the vapor phase in a flame of oxygen and hydrogen at a temperature of 1100° C.

*Example 7*

An oxide blend of silicon dioxide and 1% aluminum oxide prepared in the manner described in Example 6 is introduced in a quantity of 66 kg. into 260 kg. water. The mixture is then dispersed for 60 minutes with a turboagitator. 0.1 kg. trimetaphosphate is added prior to dispersion. The dispersion yielded contains 20 g. of solid matter in 100 g.

Having thus described this invention, we claim:

1. As a new composition of matter a substantially stable suspension in a predominantly aqueous medium of at least 15% by weight of the total composition of coformed pyrogenic oxides of (1) silicon and (2) a metal chosen from the group of the refractory inorganic metals, said oxides having been coformed by simultaneous reaction, with an oxygen-containing gas at temperatures above about 600° C., of a mixture of halide compounds of (1) silicon and (2) the corresponding metal.

2. The composition of claim 1 in which the average particle size of the metal oxides is less than 50 millimicrons in equivalent spherical diameter.

3. The composition of claim 1 in which the coformed metal oxides are silica and alumina.

4. The composition of claim 1 in which the coformed metal oxides are silica and titania.

5. The composition of claim 1 in which the coformed metal oxides are silica, alumina and titania.

6. The composition of claim 1 in which the metal oxides constitute about 30 to 60% of the weight thereof.

7. As a new composition of matter a substantially stable suspension in a predominantly aqueous medium of at least 15% by weight of the total composition of coformed pyrogenic oxides of (1) silicon and (2) a metal chosen from the group consisting of the metals of groups III and IV of the periodic table, said oxides having been coformed by simultaneous reaction, with an oxygen-containing gas at temperatures above about 600° C., of a mixture of the halide compounds of (1) silicon and (2) the corresponding metal.

8. The composition of claim 7 containing at least 30% by weight of said composition of said coformed pyrogenic oxides.

9. The composition of claim 7 containing additionally 0.1 to 2% by weight thereof of a compound selected from the group consisting of alkali-metal phosphates, alkali-metal silicates and mixtures thereof.

10. The composition of claim 7 wherein said coformed oxides are the coformed product of hydrolysis of a mixture of the corresponding halides.

11. A process for producing a stable aqueous suspension of refractory inorganic metal oxides which comprises reacting a gaseous mixture of volatile halides of silicon and a metal chosen from the group consisting of the refractory inorganic metals with an oxygen-containing gas at a temperature above about 600° C., thereby converting said metal halides to the corresponding metal oxides in an intimate coformed state, separating said coformed metal oxides from the gaseous reaction medium, and mixing with agitation at least 15% of said coformed metal oxides by weight of the total suspension into a predominantly aqueous medium.

12. A process for producing a stable aqueous suspension of refractory inorganic metal oxides which comprises reacting a gaseous mixture of volatile halides of silicon and a metal chosen from groups III and IV of the periodic table, with an oxygen-containing gas at a temperature above about 600° C., thereby converting said metal halides to the corresponding metal oxides in an intimate coformed state, separating said coformed metal oxides from the gaseous reaction medium and mixing with agitation at least 15% of said coformed metal oxides by weight of the total suspension into a predominantly aqueous medium.

13. The process of claim 12 further characterized by adding to said aqueous suspension from about 0.1 to about 2% by weight of the finished product of a compound chosen from the group consisting of alkali-metal phosphates, alkali-metal silicates and mixtures thereof.

14. A process for producing a substantially stable aqueous suspension of different metal oxides which comprises dispersing by agitation finely divided coformed pyrogenic oxides of two different metals in the proportions of from about 30–60% oxide by weight of the finished product in a predominantly aqueous medium, said oxides comprising (1) silicon dioxide and (2) an oxide of a metal of groups III and IV of the periodic table, said oxides having been coformed by simultaneous reaction of a mixture of their corresponding halide compounds with an oxygen-containing gas at temperatures above about 600° C.

References Cited in the file of this patent

UNITED STATES PATENTS

| | | |
|---|---|---|
| 2,186,095 | Booge et al. | Jan. 9, 1940 |
| 2,269,059 | McLachlan | Jan. 6, 1942 |
| 2,292,267 | Garrison | Aug. 4, 1942 |
| 2,333,948 | Muskat | Nov. 9, 1943 |

FOREIGN PATENTS

| | | |
|---|---|---|
| 713,211 | Great Britain | Aug. 4, 1954 |